US012382249B2

(12) United States Patent
Thomas et al.

(10) Patent No.: US 12,382,249 B2
(45) Date of Patent: Aug. 5, 2025

(54) METHODS AND SYSTEMS FOR ENCOURAGING BEHAVIOUR WHILE OCCUPYING VEHICLES

(71) Applicant: Adeia Guides Inc., San Jose, CA (US)

(72) Inventors: William L. Thomas, Evergreen, CO (US); Paul T. Stathacopoulos, San Carlos, CA (US); Danielle Gonzalez, Santa Clara, CA (US)

(73) Assignee: ADEIA GUIDES INC., San Jose, CA (US)

( * ) Notice: Subject to any disclaimer, the term of this patent is extended or adjusted under 35 U.S.C. 154(b) by 0 days.

(21) Appl. No.: 18/214,886

(22) Filed: Jun. 27, 2023

(65) Prior Publication Data

US 2023/0345202 A1    Oct. 26, 2023

Related U.S. Application Data

(63) Continuation of application No. 16/680,465, filed on Nov. 11, 2019, now Pat. No. 11,729,580, which is a continuation of application No. 16/128,315, filed on Sep. 11, 2018, now abandoned, which is a continuation of application No. 14/193,889, filed on Feb. 28, 2014, now abandoned.

(51) Int. Cl.
| | |
|---|---|
| *H04W 4/02* | (2018.01) |
| *B60K 35/00* | (2006.01) |
| *B60K 35/10* | (2024.01) |
| *B60K 35/65* | (2024.01) |
| *H04L 67/12* | (2022.01) |
| *H04W 4/48* | (2018.01) |

(52) U.S. Cl.
CPC .............. *H04W 4/027* (2013.01); *B60K 35/00* (2013.01); *B60K 35/10* (2024.01); *B60K 35/65* (2024.01); *B60K 2360/11* (2024.01); *H04L 67/12* (2013.01); *H04W 4/48* (2018.02)

(58) Field of Classification Search
CPC ........ H04W 4/027; H04W 4/48; B60K 35/00; B60K 35/10; B60K 35/65; B60K 2360/11
USPC ......................................................... 455/418
See application file for complete search history.

(56) References Cited

U.S. PATENT DOCUMENTS

| | | |
|---|---|---|
| 6,225,892 B1 | 5/2001 | Chene |
| 6,239,794 B1 | 5/2001 | Yuen et al. |
| 6,388,714 B1 | 5/2002 | Schein et al. |
| 6,564,378 B1 | 5/2003 | Satterfield et al. |
| 6,580,973 B2 | 6/2003 | Leivian et al. |
| 6,756,997 B1 | 6/2004 | Ward et al. |
| 7,165,098 B1 | 1/2007 | Boyer et al. |
| 7,761,892 B2 | 7/2010 | Ellis et al. |
| 8,046,801 B2 | 10/2011 | Ellis et al. |
| 8,965,621 B1 | 2/2015 | Urmson et al. |

(Continued)

FOREIGN PATENT DOCUMENTS

| | | | |
|---|---|---|---|
| JP | 2005280580 A | | 10/2005 |
| JP | 2007274427 A | * | 10/2007 |

*Primary Examiner* — Isaac G Smith
(74) *Attorney, Agent, or Firm* — HALEY GUILIANO LLP

(57) ABSTRACT

Methods and systems are disclosed herein for encouraging particular behavior while occupying vehicles. For example, by granting and restricting access to media and other user comfort devices based on whether or not a user is conforming to a predetermined rule set, the media guidance application may encourage a user to adhere to the rule set.

20 Claims, 5 Drawing Sheets

(56) References Cited

U.S. PATENT DOCUMENTS

| | | |
|---|---|---|
| 8,971,927 B2 | 3/2015 | Zhou et al. |
| 2002/0174430 A1 | 11/2002 | Ellis et al. |
| 2003/0073448 A1* | 4/2003 | Ozeki ................ H04W 12/082 |
| | | 455/565 |
| 2003/0110499 A1 | 6/2003 | Knudson et al. |
| 2005/0251827 A1 | 11/2005 | Ellis et al. |
| 2006/0145537 A1 | 7/2006 | Escott |
| 2007/0072553 A1* | 3/2007 | Barbera ............ H04M 1/72463 |
| | | 455/67.11 |
| 2007/0115101 A1 | 5/2007 | Creekbaum et al. |
| 2008/0129684 A1 | 6/2008 | Adams et al. |
| 2009/0306834 A1 | 12/2009 | Hjelm et al. |
| 2010/0153885 A1 | 6/2010 | Yates |
| 2012/0041633 A1 | 2/2012 | Schunder et al. |
| 2012/0083960 A1 | 4/2012 | Zhu et al. |
| 2012/0271484 A1 | 10/2012 | Feit et al. |
| 2013/0038437 A1 | 2/2013 | Talati et al. |
| 2013/0281079 A1 | 10/2013 | Vidal et al. |
| 2013/0303143 A1 | 11/2013 | Schrader et al. |
| 2013/0342337 A1 | 12/2013 | Kiefer et al. |
| 2014/0019167 A1* | 1/2014 | Cheng .................... G06Q 40/08 |
| | | 705/4 |
| 2014/0218187 A1 | 8/2014 | Chun et al. |
| 2015/0054639 A1 | 2/2015 | Rosen |
| 2015/0249906 A1 | 9/2015 | Thomas et al. |
| 2019/0028847 A1 | 1/2019 | Thomas et al. |

\* cited by examiner

METHODS AND SYSTEMS FOR ENCOURAGING BEHAVIOUR WHILE OCCUPYING VEHICLES

This application is a continuation of U.S. patent application Ser. No. 16/680,465 filed on Nov. 11, 2019, which is a continuation of U.S. patent application Ser. No. 16/128,315 filed Sep. 11, 2018, now abandoned, which is a continuation of Ser. No. 14/193,889, filed Feb. 28, 2014, now abandoned, each of which is hereby incorporated by reference herein in its entirety, respectively.

BACKGROUND

Recent advances have allowed users to access media in places in which they previously could not. For example, the rise in mobile technology has allowed a user to access media of all types even while the user is moving from one place to another. A typical example, is a user accessing his or her cellular telephone while in an automobile. Despite the added convenience of these advances, these advances also have their drawbacks. For example, accessing media, whether text messages or video content, is a dangerous activity to perform while driving a vehicle. In fact, such activities are outlawed in numerous jurisdictions. However, notwithstanding the illegality of the activity, these activities continue to be performed.

SUMMARY

Accordingly, methods and systems are disclosed herein for encouraging particular behavior while occupying vehicles. Specifically, by granting and restricting access to media and other user comfort devices based on whether or not a user is conforming to a predetermined rule set, the media guidance application may encourage a user to adhere to the rule set. For example, while occupying a vehicle (e.g., whether a driver or a passenger), the media guidance application may monitor the activities performed by the user and the vehicle to determine whether the activities (e.g., the speed at which the vehicle is traveling, the location to which the vehicle is travelling, etc.) corresponds to one or more criteria (e.g., a maximum speed for the vehicle, a maximum distance of travel for the vehicle, etc.) associated with a rule set.

In some aspects, the media guidance application receives a rule set associated with desired user behaviors while occupying a vehicle. For example, the media guidance application may receive a user input selecting a rule set corresponding with a specific goal. For example, the rule set may correspond to not exceeding speed limits at various locations, not varying from a predetermined route, not using particular devices (e.g., smartphones) while occupying the vehicle, not performing particular activities (e.g., reading/writing text messages) while occupying the vehicle, etc.

The media guidance application may also determine a media option that is associated with adherence to the rule set. For example, the media option may include an option related to a presentation volume of content (e.g., how loud music may be played in the vehicle), an option related to content that is presented (e.g., whether or not a media asset may be presented while a user is occupying a vehicle), an option related to a display device setting (e.g., whether or not video output associated with a media asset may be shown), an option related to a speaker setting (e.g., whether or not audio output associated with a media asset may be shown), an option related to a climate control setting (e.g., whether or not air conditioning or heating systems may be accessed), or an option related to a movement of the vehicle (e.g., where to, or how fast, the vehicle may move).

The media guidance application then cross-references the rule set with a database listing rules associated with rule sets to determine a rule that corresponds to the rule set. For example, each rule set may be associated with various rules also corresponding to fulfilment of the goal associated with the rule set. For example, if a rule set corresponds to not exceeding speed limits at various locations, the rule set may include one or more rules indicating a speed limit at various location. If a rule set corresponds to not varying from a predetermined route, the rule set may include one or more rules indicating a maximum distance from a route, or a pre-approved sub-route, associated with various locations. If the rule set corresponds to not using particular devices while occupying the vehicle, the rule set may include one or more rules indicating user devices that are not approved for use (e.g., smartphones, tablets, etc.). If the rule set corresponds to not performing particular activities while occupying the vehicle, the rule set may include one or more rules indicating what activities, if any, are prohibited (e.g., texting) or required (e.g., use of a seatbelt).

The media guidance application then monitors a user behavior while a user is occupying the vehicle. For example, the media guidance application may monitor the user behavior while the user is occupying the vehicle by monitoring global-positioning data received from global positioning circuitry, vehicular speed data received from a speedometer, or vehicular status data received from vehicular circuitry.

The media guidance application then compares the user behavior to the rule to determine whether the user behavior corresponds to the rule and enables (or disables) the media option in response to determining that the user behavior corresponds to (or does not correspond to) the rule. For example, the media guidance application may detect that a vehicle (e.g., being manually driven or driven automatically via self-driving capabilities) is outside a predetermined area (or deviating from a predetermined route (e.g., in violation of a rule included in a current rule set), and, in response the media guidance application may disable a media option associated with the vehicle.

In some embodiments, a media option may be associated with a mobile user device, not necessarily associated with the vehicle. For example, the media guidance application may detect a mobile user device (or the use of a mobile device) within the vehicle (e.g., in violation of a rule included in a current rule set), and, in response, the media guidance application may disable the use of the mobile user device.

In some embodiments, the media guidance application may perform actions alternatively to, or in addition to, enabling or disabling a media option. For example, in response to determining a user behavior is in violation of a rule, the media guidance application may notify a user (or a third party) of a relationship between the user behavior and the rule (e.g., the rule that the user is currently in violation of or, a degree to which a user is violating the rule, etc.). For example, if the media guidance application determines that a mobile user device located within a vehicle is attempting to access a media option (e.g., send a text message) while the media option is disabled (e.g., text messaging is in violation of a rule), the media guidance application may notify a third party (e.g., a parent).

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
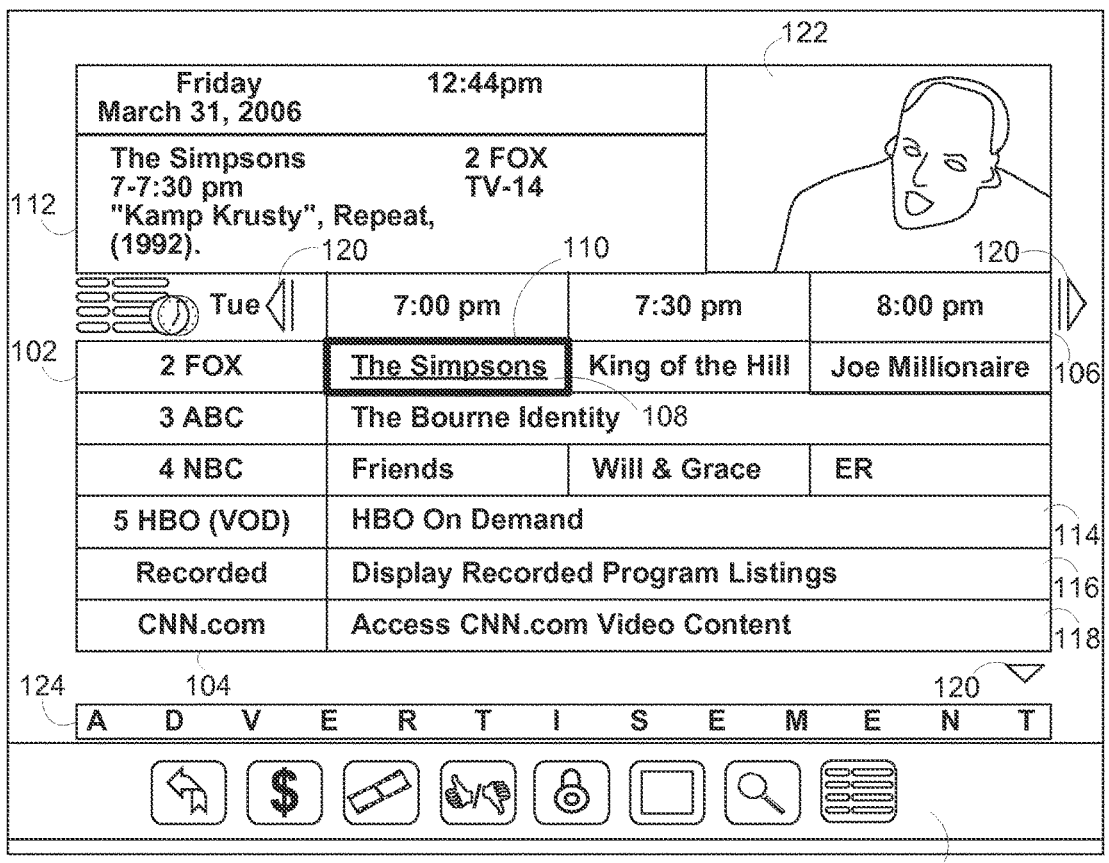
FIG. 1 shows an illustrative example of a media guidance application in accordance with some embodiments of the disclosure.

Methods and systems are disclosed herein for encouraging particular behavior while occupying vehicles. Specifically, by granting and restricting access to media and other user comfort devices based on whether or not a user is conforming to a predetermined rule set, the media guidance application may encourage a user to adhere to the rule set. For example, while occupying a vehicle (e.g., whether the driver or a passenger), the media guidance application may monitor the activities performed by the user and the vehicle to determine whether the activities (e.g., the speed at which the vehicle is traveling, the location to which the vehicle is travelling, etc.) corresponds to one or more rules (e.g., a maximum speed for the vehicle, a maximum distance of travel for the vehicle, etc.) associated with a rule set.

As used herein, "a media guidance application," "interactive media guidance application," or "guidance application" refers to a form of media guidance through an interface that facilitates access to media content. In some embodiments, the media guidance application may be provided as an on-line application (i.e., provided on a website), or as a stand-alone application on a server, user device, etc. Various devices and platforms that may implement the media guidance application are described in more detail below. In some embodiments, the media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media card, register memory, processor caches, Random Access Memory ("RAM"), etc.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

In some embodiments, the media guidance application receives a rule set associated with desired user behaviors while occupying a vehicle. As used herein, a "rule set" refers to a collection of one or more rules that indicate a user behavior that corresponds to a specific goal. As used herein, a "rule" refers to a user behavior that corresponds to a component of the specific goal. For example, if the rule set may correspond to not to exceeding speed limits, a first rule of the rule set may indicate a particular speed limit at a first location and a second rule set may indicate a particular speed limit at a second location. If the rule set corresponds to not varying from a predetermined route, a first rule of the rule set may indicate a first location during the route that the user should traverse and a second rule set may indicate a second location during the route that the user should traverse. If the rule set corresponds to not using particular devices (e.g., smartphones) while occupying the vehicle, a first rule of the rule set may indicate a first device (or a first type of device) that should not be used and a second rule set may indicate a second device (or a second type of device) that should not be used. If the rule set corresponds to not performing particular activities (e.g., reading/writing text messages) while occupying the vehicle, a first rule of the rule set may indicate a first activity (or a first type of activity) that should not be performed and a second rule set may indicate a second activity (or a second type of activity) that should not be performed.

As used herein, a "user behavior" refers to any attribute that describes whether or not a user is performing an activity, or the degree to which a user is performing an activity, while occupying a vehicle. It should be noted that a user behavior, includes but is not limited to, attributes that describe the vehicle (e.g., the location, speed, etc.) as well.

The media guidance application may also determine a media option that is associated with adherence to the rule set. As used herein, a "media option" refers to any option related to the access, consumption, selection, or navigation of media assets and/or content. For example, a media option may include an option related to a presentation volume of content (e.g., how loud music may be played in the vehicle), an option related to content that is presented (e.g., whether or not a media asset may be presented while a user is occupying a vehicle), an option related to a display device setting (e.g., whether or not video output associated with a media asset may be shown), an option related to a speaker setting (e.g., whether or not audio output associated with a media asset may be shown), an option related to a climate control setting (e.g., whether or not air conditioning or heating systems may be accessed), or an option related to a movement of the vehicle (e.g., where to, or how fast, the vehicle may move).

In some embodiments, a media option may be associated with a mobile user device, not necessarily associated with the vehicle. For example, the media guidance application may detect a mobile user device (or the use of a mobile device) within the vehicle (e.g., in violation of a rule included in a current rule set), and, in response, the media guidance application may disable the use of the mobile user device.

In some embodiments, the media guidance application may enable/disable any interior feature of a vehicle. As used herein, an "interior feature" is any feature used actively or passively by a user while occupying a vehicle (e.g., climate control, navigation, door locks, etc.). For example, interior features, as discussed below in relation to FIG. 5, may include any enabling/disabling (or limiting the functions thereof) of any device within a vehicle, any vehicle option (whether equipped on standard vehicle models or customized) accessible while a user is within a vehicle, or any system of vehicle used by a user.

In some embodiments, the media guidance application may perform actions alternatively to, or in addition to, enabling or disabling a media option. For example, in response to determining a user behavior is in violation of a rule, the media guidance application may notify a user (or a third party) of a relationship between the user behavior and the rule (e.g., the rule the user is currently in violation or, a degree to which a user is violating the rule, etc.). For example, if the media guidance application determines that a mobile user device located within a vehicle is attempting to access a media option (e.g., send a text message) while the media option is disabled (e.g., text messaging is in violation of a rule), the media guidance application may notify a third party (e.g., a parent).

For example, alternatively to, or in addition to, enabling or disabling a media option of a vehicle or user device within a vehicle occupied by a user, the media guidance application may alert a third party (e.g., a parent) associated with the user. The alert may include numerous forms. For example, the alert may appear as a text message to a parent describing the current status of the vehicle and/or the user, the alert may appear as a dashboard (e.g., overlaying the display of a user device associated with the third party) that provides numerous options (e.g., communicating with the user, stopping connectivity to a user device operated within the vehicle and/or associated with the user, changing a travel itinerary associated with the vehicle, overriding controls of the vehicle and/or remotely operating the vehicle, etc.) that may be applied manually by the third party or automatically (e.g., after a predetermined amount of time or immediately) unless the third party instructs the media guidance application otherwise.

In some embodiments, the media guidance application may publically distribute the notification and/or media assets associated with the user. For example, the media guidance application may retrieve a list of friends (e.g., a social network buddy list), contacts (e.g., retrieved from a phone/text message/e-mail account associated with the user), and/or other listings featuring other entities with known associations to the user and distribute the notification and/or media assets to contacts. For example, in response to determining that the behavior of a user has violated a rule, the media guidance application may post messages to the social network account associated with the user.

As used herein, a "social network," refers to a platform that facilitates networking and/or social relations among people who, for example, share interests, activities, backgrounds, and/or real-life connections. In some cases, social networks may facilitate communication between multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by social media provider may make content (e.g., status updates, microblog posts, images, graphic messages, etc.) associated with a first user accessible to a second user that is within the same social network as the first user. In such cases, classes of entities may correspond to the level of access and/or the amount or type of content associated with a first user that is accessible to a second user.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
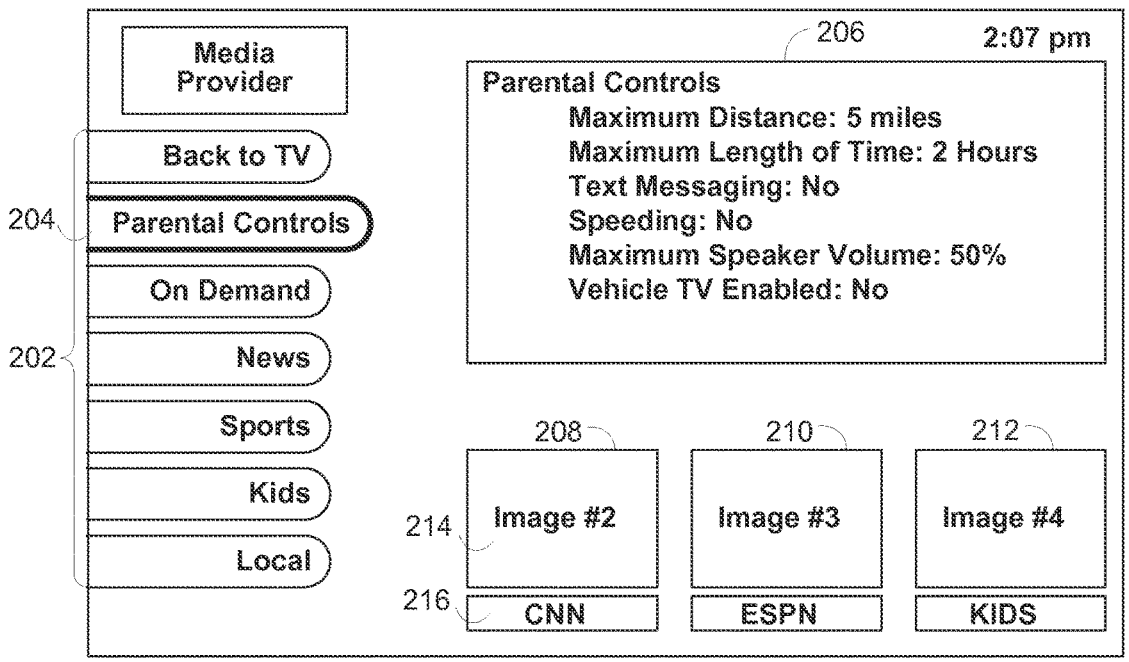
FIG. 2 shows another illustrative example of a media guidance application in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. For example, FIG. 1 may represent a display available to a user while the user is occupying a vehicle. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media assets, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. For example, FIG. 2 may represent a display available to a user while the user is occupying a vehicle. Video mosaic display 200 includes selectable options 202 for content information organized based on content type, genre, and/or other organization criteria. In display 200, parental control option 204 is selected, thus providing information related to parental controls in window 206. For example, window 206 may indicate rules or rule sets that are currently available and/or are currently active. Through window 206, the media guidance application may also display options related to parental controls. For example, the media guidance application may allow a user to customize the rules, rule sets, and/or media options available to a user (or not available to a user) based on a particular user behavior.

In some embodiments, a media guidance application may automatically retrieve a set of custom rules based on the demographic, geographic, familial status of a user. For example, if a user is located in the state of Kansas, the media guidance application may automatically retrieve a rule set that corresponds to the driving regulations associated with the state of Kansas. In another example, if a user is eighteen years old, the media guidance application may automatically retrieve a rule set that corresponds to proper driving etiquette for eighteen year olds. In yet another example, if a user is part of a family grouping that has a custom rule set, the media guidance application may automatically retrieve the custom rule set in response to determining that the user is part of the family.

Display 200 also includes listings 208, 210, and 212 as program listings. For example, listings 208, 210, and 212 may correspond to media assets that are available to a user based on the current behavior of the user. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
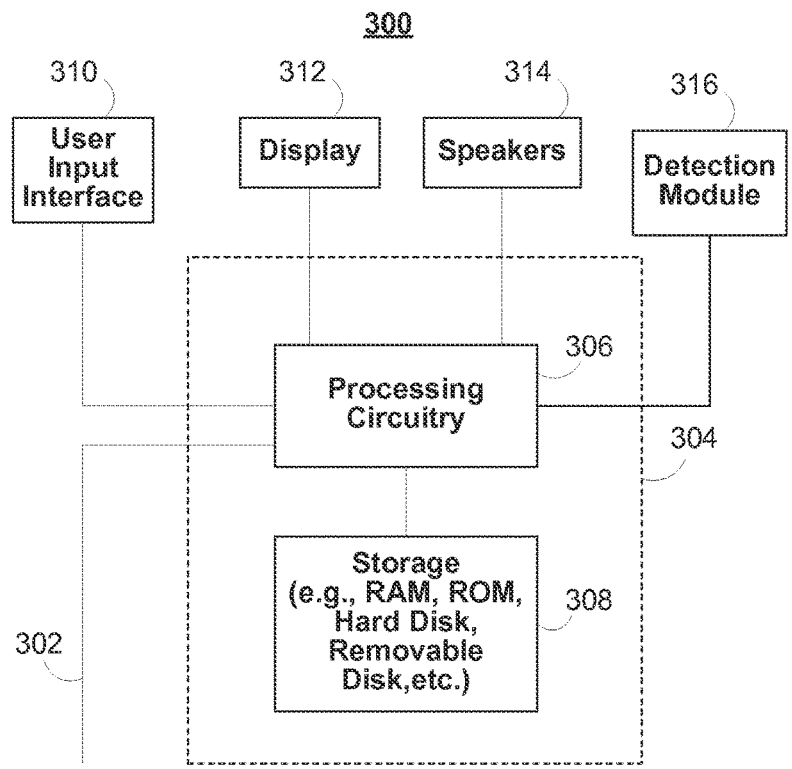
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data and guidance application data that are described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature polysilicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

Detection module 316, or the detection module circuitry, may be incorporated into, coupled to, or accessible by the media guidance application (e.g., via control circuitry 304. Detection module 316 may be used to monitor, identify, and determine user and/or vehicular behavior. For example, the media guidance application may receive data describing the user behavior while occupying a vehicle by monitoring global-positioning data received from global positioning circuitry, vehicular speed data received from a speedometer, or any other vehicular status data received from any other vehicular circuitry and/or component that describes the behavior of the user or the vehicle.

In some embodiments, detection module 316 may include a Global Positioning System ("GPS") detection component, which determines or receives information describing the geographic position of a user. For example, the GPS detection component may, additionally or alternatively, determine whether or not the user is taking a particular route (e.g., whether or not the current position of a user corresponds to a position in the route), is on schedule (e.g., whether or not the current position of a user corresponds to the position the user is scheduled to be at the route based on the current time), or the current travelling speed of the user. In some embodiments, the GPS detection component includes one or more sensors that transmit data to processing circuitry 306, which determines a change and/or update to a user's travel itinerary, a user status, and/or objective.

In some embodiments, detection module 316 may include an Internet access component, which determines or receives information describing the current trip retrieved over the Internet. For example, the Internet access component may, additionally or alternatively, determine whether or not information on the Internet (e.g., a website of an airline) indicates a change or update to the determined travel itinerary or the determined objective of the user. Additionally or alternatively, detection module 316 may include a vehicle access component, which determines or receives information (e.g., from the odometer, speedometer, etc. of a car) describing the current trip retrieved from the vehicle. For example, the media guidance application may be configured to receive information from the flight control system of an airplane, control system of manually controlled or automatically controlled (e.g., a self-driving car) automobile, etc. In some embodiments, the Internet access component and vehicle access component may transmit data to processing circuitry 306, which determines a change and/or update to a user's travel itinerary, a user status, and/or objective.

For example, detection module 316 may access and/or receive commands from systems and/or data associated with the method or mode of transportation. For example, detection module 316 may receive specific inputs from the media control system associated with the method or mode of transportation (e.g., an airline IFE system or suitable self-driving car system). Furthermore, the media guidance application may incorporate information and/or commands. For example, during a trip, detection module 316 may incorporate driver/pilot/flight attendant announcements, flight/navigation equipment signals, and/or data collected on previous trips. Furthermore, the media guidance application may determine when or how to deliver/incorporate commands. For example, the media guidance application may wait to deliver messages (e.g., notification of violations of rules), instructions to enable/disable media options, etc. based on current conditions of the trip. For example, if a user is currently in an immediately hazardous situation, the media guidance application may delay notifying the user of rule violations if such notification would only increase the hazards to the user (e.g., distract the user from the immediate danger).

In some embodiments, detection module 316 may access and/or receive commands from systems and/or data associated with the user. For example, detection module 316 may access a bio-metric application on a device associated with a user to interface with or pull data about the user. For example, if the data retrieved from the user's device indicates the user did not sleep well, is intoxicated, or distracted, the media guidance application may adjust the rules or rule sets accordingly.

It should be noted detection module 316 may also interface with other users, devices, and/or people near a user. For example, detection module 316 may determine (e.g., via the detection methods above) whether other users, devices, and/or people near the user are talking, sleeping, moving about the vehicle, being active, performing functions (e.g., sending text messages), etc. This information may also be used to determine user behaviors.

In some embodiments, to monitor user behavior, and/or adherence to one or more rules or rule sets, the media guidance application may receive data associated with the travel itinerary. As used herein, a "travel itinerary" refers to a description of the circumstances and/or progress of a current trip of a user. For example, a travel itinerary may include numerous details associated with the travel itinerary, including, but not limited to, the location of departure and/or arrival (e.g., including, but not limited to, the geographical location, customs and/or activities associated with the location, things-to-do, cultural elements and/or attractions, etc.), length of travel (e.g., including, but not limited to, time and/or distance spent travelling, time spent at one or more locations, etc.), time of departure and/or arrival (e.g., including any time-zone changes), anticipated stops (e.g., layovers, fuel stops), route (e.g., either currently taken or expected to take), of the current trip of the user. In addition, details associated with the travel itinerary may include activities or occurrence that occurs before or after a current trip. For example, a scheduled work-shift that begins contemporaneously with the end of a current trip (e.g., as indicated by a calendar application associated with the user) may be related to the current trip (e.g., a user was travelling to work). In some embodiments, this information, or any of the other details explained above and below, may be used to determine whether or not the behavior of a user corresponds to one or more rules in a rule set.

In some embodiments, additional factors, user preferences, parental controls may adjust the rule sets and/or rules applied. For example, the media guidance application may apply different rule sets at different times based on information received about a purpose or goal of a current trip. For example, if a user is travelling for work (e.g., as indicated by the travel itinerary), the rule sets and/or rules that associated with a destination of a current trip, the route of a current trip, and the length of time associated with the current trip may differ than rule sets and/or rules if a user is not travelling for work.

Additionally or alternatively, the media guidance application may determine the user behaviors by applying one or more content recognition techniques. For example, detection module 316 may record user behavior while a user is occupying a vehicle. For example, the media guidance application (e.g., via control circuitry 304) may use a content recognition module or algorithm to generate data describing the context, content, and/or any other data necessary for determining a user behavior. For example, the content recognition module may use object recognition techniques such as edge detection, pattern recognition, including, but not limited to, self-learning systems (e.g., neural networks), optical character recognition, on-line character recognition (including, but not limited to, dynamic character recognition, real-time character recognition, intelligent character recognition), and/or any other suitable technique or method to analyze recorded behavior of a user. For example, the media guidance application may receive data in the form of a video. The video may include a series of frames. For each frame of the video, the media guidance application may use a content recognition module or algorithm to determine the objects (e.g., people, places, things, etc.) in each of the frames or series of frames, which may be used to determine user behaviors. For example, based on the detection of a looking/touching a mobile device, the media guidance application may determine the user is accessing a mobile device. The media guidance application may then compare this determination to the one or more rules or rule sets to determine if this action corresponds to one or more rules or rule sets.

In some embodiments, the content recognition module or algorithm may also include speech recognition techniques, including, but not limited to, Hidden Markov Models, dynamic time warping, and/or neural networks (as described above) to translate spoken words into text and/or processing audio data. The content recognition module may also combine multiple techniques to determine user behavior.

In addition, the media guidance application may use multiple types of optical character recognition and/or fuzzy logic, for example, when processing keyword(s) retrieved from data (e.g., textual data, translated audio data, user inputs, etc.) describing user behavior (or when cross-referencing various types of data in databases). For example, if the particular data received is textual data, using fuzzy logic, the media guidance application (e.g., via a content recognition module or algorithm incorporated into, or accessible by, the media guidance application) may determine two fields and/or values to be identical even though the substance of the data or value (e.g., two different spellings) is not identical.

In some embodiments, the media guidance application may analyze particular received data of a data structure or media asset frame for particular values or text using optical character recognition methods described above in order to determine a characteristic of a media asset. For example, the media guidance application may process audio content of a media asset to find particular keywords that may be indicative of a user behavior.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
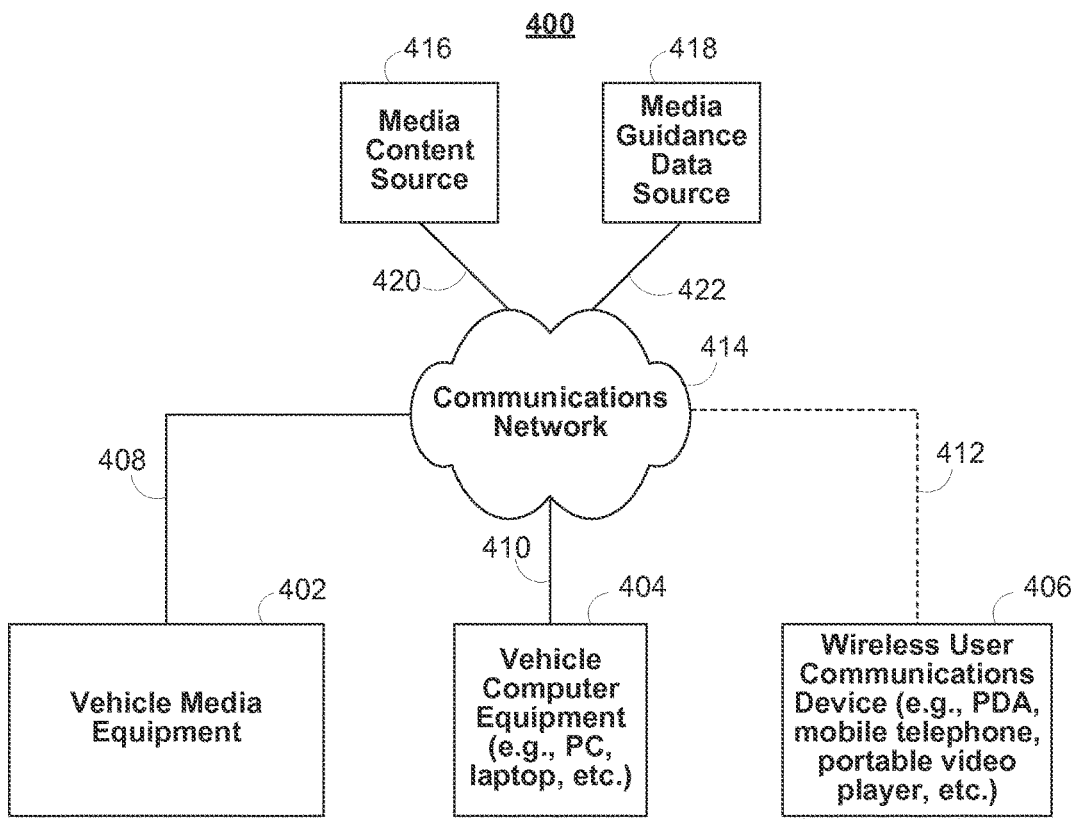
FIG. 4 is a block diagram of an illustrative media system in accordance with some embodiments of the disclosure.

User equipment device 300 of FIG. 3 can be implemented in system 400 of FIG. 4 as vehicle television equipment 402, vehicle computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below. In some embodiments, user equipment may refer to components incorporated into, coupled to, or accessible by a vehicle.

A user equipment device utilizing at least some of the system features described above in connection with FIG. 3 may not be classified solely as vehicle television equipment 402, vehicle computer equipment 404, or a wireless user communications device 406. For example, vehicle television equipment 402 may, like some vehicle computer equipment 404, be Internet-enabled allowing for access to Internet content, while user computer equipment 404 may, like some vehicle television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., vehicle television equipment 402, vehicle computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home and vehicular devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, vehicle television equipment 402, vehicle computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
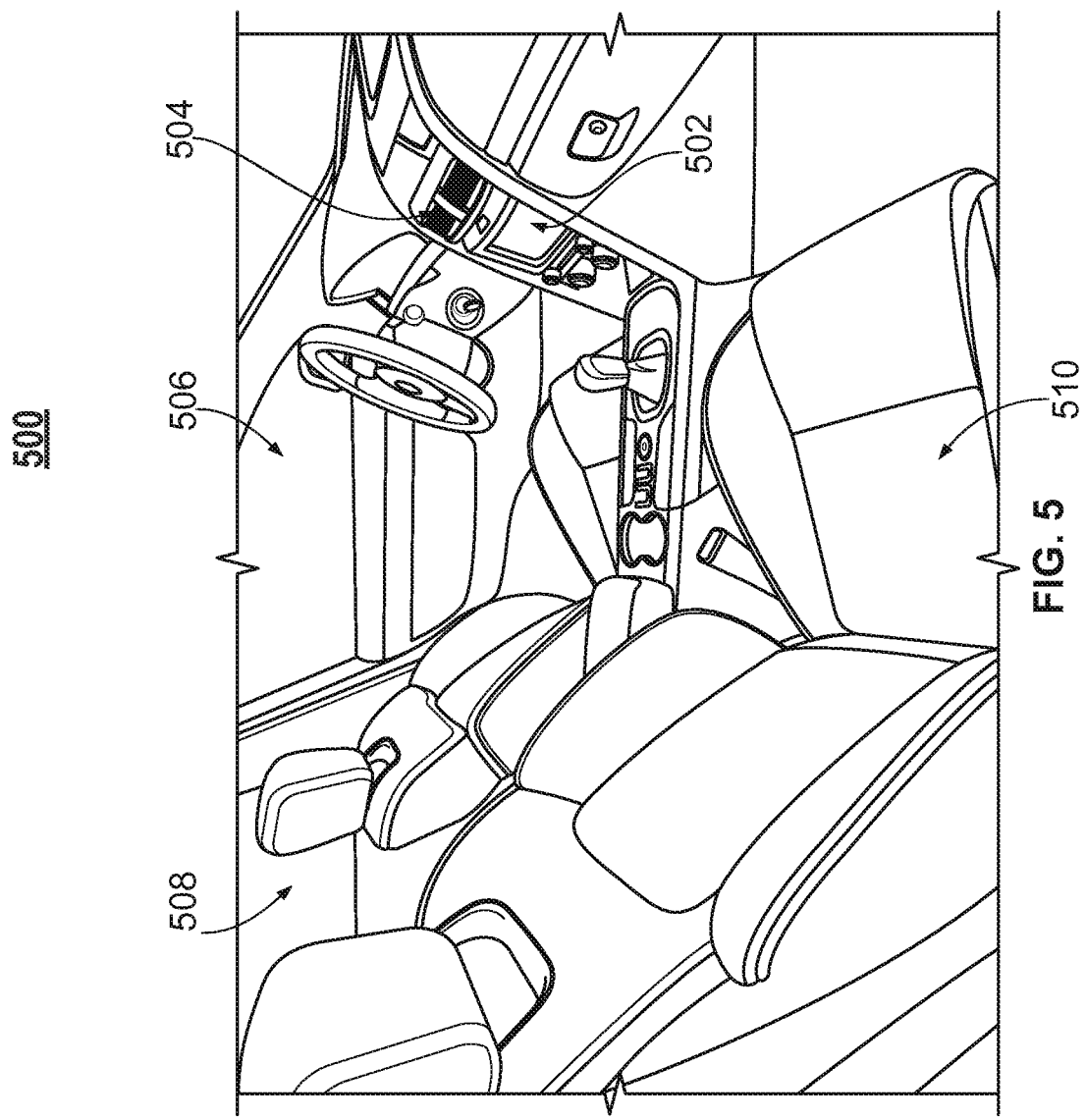
FIG. 5 shows an illustrative example of a vehicle featuring various media options in accordance with some embodiments of the disclosure.

FIG. 5 shows a vehicle 500 equipped with a media guidance application that may be used to enable/disable media options and/or other interior features. For example, an interior feature may be located within the mechanisms or engine of a vehicle (e.g., heating/cooling system 504). In addition, an interior feature may form or create a boundary for interior or cargo space of vehicle 500 (e.g., windows 506 or sunroof (not shown)). Interior features may be in direct contact with a user (e.g., headrest 508 or seat 510), may be included within a feature in contact with a user (e.g., a heater located within seat 510), may be located on the exterior of vehicle (e.g., windshield wipers and fluid (not shown) or external thermometers (not shown)), or may be a mobile device (e.g., a smartphone) that may be freely taken within or out of the vehicle. Interior features may be equipped in vehicle 500 upon manufacturing (e.g., by the manufacturer of vehicle 500) or may be added as modifications and/or upgrades after the manufacturing of vehicle 500 (e.g., by the manufacturer or third party).

For example, a user in vehicle 500 may use media component 502 to access a media asset and/or media options associated with a media asset. In some embodiments, media component 502 may be an audio and/or video system incorporated into vehicle 500 or user equipment used to access a media asset while using vehicle 500.

Vehicle 500 may have numerous interior features used to provide media options. Vehicle 500 may include any type of vehicle (e.g., automobiles, airplanes, motorcycles, recreational vehicles, boats, helicopters, or any other device or equipment capable of transporting and/or being occupied by a user). In some embodiments, vehicle 500 may determine the position of a user accessing a media asset or media option via the media guidance application. For example, in some embodiments, vehicle 500 may use sensors (e.g., associated with detection module 316 (FIG. 3)) in seat 510 or other interior feature (e.g., a seat belt) to detect a user or a user behavior. In some embodiments, users may input data describing their position or behavior via a user interface (e.g., user input interface 312 (FIG. 3)) incorporated into or accompanying media component 502 either by direct input into the user interface (e.g., activating the system via selectable option 204 (FIG. 2) to affect particular positions) or passive detection schemes (e.g., detecting a user accessing seat-belt or a headphone jack corresponding to a particular seat). For example, in some embodiments, a user may need to actively turn-on the parental control/monitoring features in order for the vehicle to turn on. In such embodiments, the guidance application may direct the interior features to only be enabled/disabled at a particular position within the vehicle (e.g., a particular seat on an airplane or bus).

In some embodiments, vehicle 500 may include particular zones or areas which correspond to the location of a user. In some embodiments, these locations may correspond to the locations of seat belts or climate control zones. The interior features of vehicle may be equipped to alter media options for one or more zones at a time. For example, the driver of vehicle 500 may not wish to have a media option enable/disable based on the behavior of a passenger. The media guidance application may determine the position of users accessing a media asset and/or media option and direct a vehicle interior features (e.g., a vehicle television in the passenger seat of the vehicle) in response to media guidance application enable/disable instructions.

In some embodiments, the guidance application receives media information associated with a media asset and/or user device being accessed in the vehicle. As used herein, "media information" refers to data associated with the media asset, media option, and/or user device that may be used by the media guidance application to determine whether a behavior of a user corresponds to a rule or rule set. For example, media information may include condition identifiers, which may include signals, metadata, triggers, flags, or data packets associated with the media asset, media option, and/or user device that may indicate to the media guidance application that a user is performing (or not performing) a particular behavior. For example, a mobile device may transmit signals that may be detected (e.g., via detection module 316 (FIG. 3)) to determine whether or not a user behavior corresponds to a rule or rule set.

Figure 6:
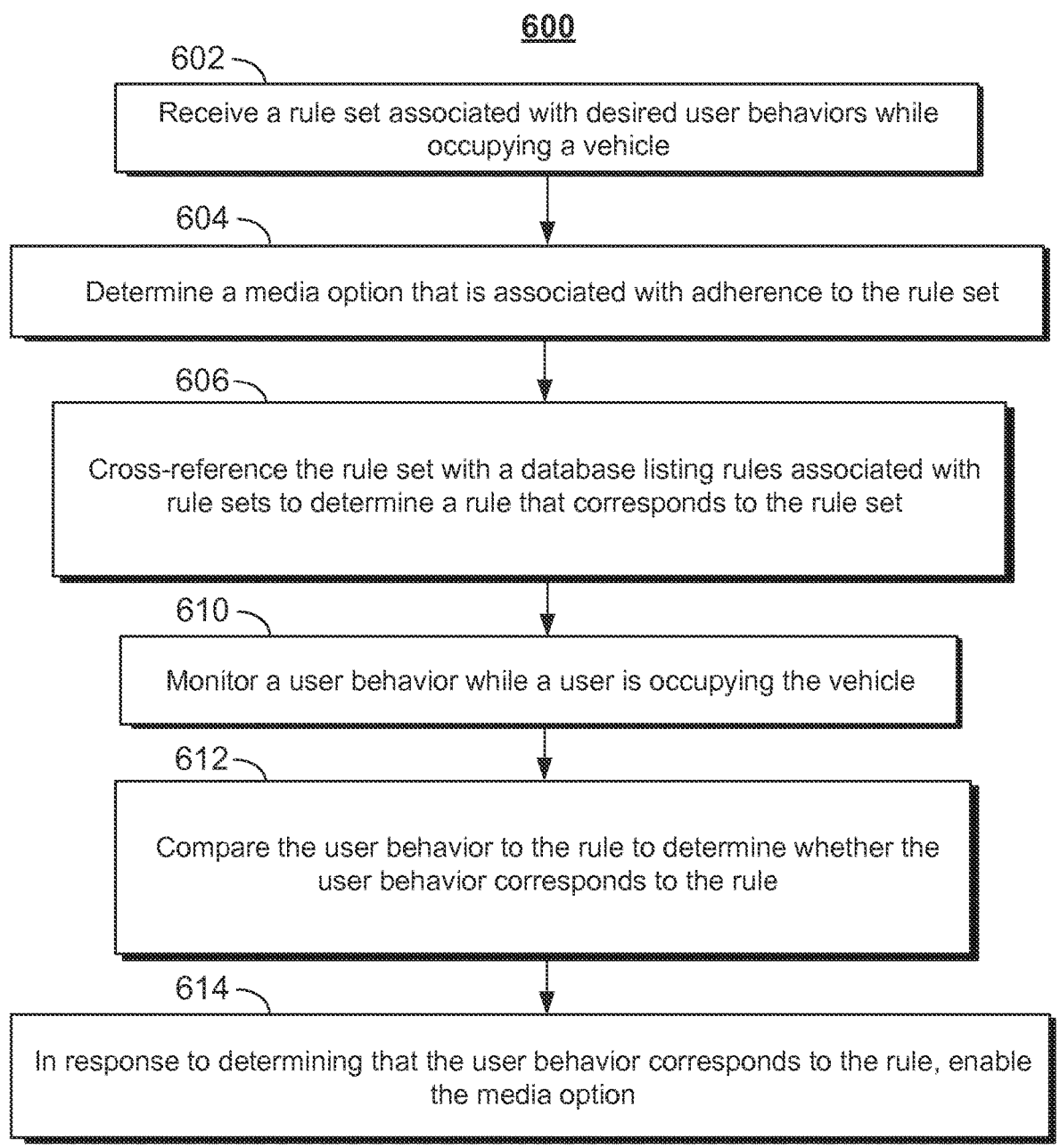
FIG. 6 is a flowchart of illustrative steps for enabling a media option in response to determining that the user behavior corresponds to a rule in accordance with some embodiments of the disclosure.

FIG. 6 is a flowchart of illustrative steps for enabling a media option in response to determining that the user behavior corresponds to a rule. It should be noted that process 600 or any step thereof could be performed on, or provided by, any of the devices shown in FIGS. 3-4. For example, process 600 may be executed by control circuitry 304 (FIG. 3) as instructed by a media guidance application implemented on a user device (e.g., user equipment devices 402, 404, and/or 406 (FIG. 4)) in order to determine whether to determine whether or not a user behavior corresponds to a rule. In addition, one or more steps of process 600 may be incorporated into or combined with one or more steps of any other process or embodiment (e.g., process 700 (FIG. 7)).

At step 602, the media guidance application receives a rule set associated with desired user behaviors while occupying a vehicle. For example, the media guidance application may receive a user input (e.g., via user input interface 310 (FIG. 3)) selecting a rule set (e.g., from window 204 (FIG. 2)) corresponding with a specific goal. For example, the rule set may correspond to not exceeding speed limits at various locations, not varying from a predetermined route, not using particular devices (e.g., smartphones) while occupying the vehicle, not performing particular activities (e.g., reading/writing text messages) while occupying the vehicle, etc.

Alternatively or additionally, the media guidance application may receive (e.g., via I/O path 302 (FIG. 3)) a rule set transmitted from a remote location (e.g., a remote user device), which accesses the media guidance application via a communications network (e.g., communications network 414 (FIG. 4)), that indicates the particular rule set that should applied. For example, a remote device (e.g., operated by a parent) may set and/or customize the rule set that governs the media options enabled/disabled based on the behavior or a user (e.g., a child) while operating a vehicle.

Alternatively or additionally, the media guidance application may receive (e.g., from storage 308 (FIG. 3)) a rule set based on predetermined conditions. For example, the media guidance application may store one or more user profiles, each associated with a particular user, and each indicating one or more rule sets that should be applied to the user while occupying the vehicle. For example, customizations to the rules, rule sets, and/or available media options may be retrieved by the media guidance application upon the media guidance application identifying (e.g., manually via a user input through user input interface 310 (FIG. 3) or automatically via detection module 316 (FIG. 3)) a user.

In some embodiments, the media guidance application may inherent a rule set based on rules associated with other devices and/or vehicles. For example, if parental controls indicate that content of a particular rating is never permitted on a set-top box in a household of a user, the media guidance application may determine that content with the same rating is also never permitted on any devices associated with or brought into a vehicle occupied by the user. Additionally or alternatively, the media guidance application may retrieve parental controls associated with a user for a plurality of devices (e.g., vehicles, set-top boxes, smartphones, etc.), the media guidance application may then apply all of the parental controls to the vehicle and/or devices brought into the vehicle or may filter the parental controls for rule sets specific to use of a vehicle and apply only those rule sets.

At step 604, the media guidance application (e.g., via control circuitry 304 (FIG. 3)) determines a media option that is associated with adherence to the rule set. For example, the media option may include an option related to a presentation volume of content (e.g., how loud music may be played in the vehicle), an option related to content that is presented (e.g., whether or not a media asset may be presented while a user is occupying a vehicle), an option related to a display device setting (e.g., whether or not video output associated with a media asset may be shown), an option related to a speaker setting (e.g., whether or not audio output associated with a media asset may be shown), an option related to a climate control setting (e.g., whether or not air conditioning or heating systems may be accessed), or an option related to a movement of the vehicle (e.g., where to, or how fast, the vehicle may move).

For example, the media guidance application may query a database, for example, located locally (e.g., on storage 308 (FIG. 3)) or remotely (e.g., at media content source 416 (FIG. 4), media guidance data source 418 (FIG. 4), and/or located at any location accessible via communications network 414 (FIG. 4)) to determine a media option that is associated with adherence to the rule set. For example, the database may be structured as a look-up table. The media guidance application (e.g., via control circuitry 304 (FIG. 3)) may input a rule and/or rule set into the look-up table. The look-up table may then filter the results and output all media options that correspond to the particular rule set.

At step 606, the media guidance application cross-references the rule set with a database listing rules associated with rule sets to determine a rule that corresponds to the rule set. For example, each rule set may be associated with various rules also corresponding to fulfilment of the goal associated with the rule set. For example, if a rule set corresponds to not exceeding speed limits at various locations, the rule set may include one or more rules indicating a speed limit at various locations. If a rule set corresponds to not varying from a predetermined route, the rule set may include one or more rules indicating a maximum distance from a route, or pre-approved sub-routes, associated with various locations. If the rule set corresponds to not using particular devices while occupying the vehicle, the rule set may include one or more rules indicating user devices that are not approved for use (e.g., smartphones, tablets, etc.). If the rule set corresponds to not performing particular activities while occupying the vehicle, the rule set may include one or more rules indicating what activities, if any, are prohibited (e.g., texting) or required (e.g., use of a seatbelt).

Similar to step 604, the media guidance application may query a database that is located locally (e.g., on storage 308 (FIG. 3)) or remotely (e.g., at media content source 416 (FIG. 4), media guidance data source 418 (FIG. 4), and/or located at any location accessible via communications network 414 (FIG. 4)) to determine a rule that corresponds to a rule set. For example, the database may be structure as a look-up table. The media guidance application (e.g., via control circuitry 304 (FIG. 3)) may input a rule set into the look-up table. The look-up table may then filter the results and output all rules that correspond to the particular rule set.

At step 608, the media guidance application monitors a user behavior while a user is occupying the vehicle. For example, the media guidance application may monitor (e.g., via detection module 316 (FIG. 3)) the user behavior while the user is occupying the vehicle by monitoring global-positioning data received from global positioning circuitry (e.g., incorporated into, coupled to, and/or accessible by control circuitry 304 (FIG. 3)), vehicular speed data received from a speedometer (e.g., incorporated into, coupled to, and/or accessible by control circuitry 304 (FIG. 3)), or vehicular status data received from vehicular circuitry (e.g., incorporated into, coupled to, and/or accessible by control circuitry 304 (FIG. 3)).

Additionally or alternatively, as discussed above, the media guidance application (e.g., via detection module 316 (FIG. 3)) may monitor for signals, metadata, triggers, flags, or data packets associated with a media asset, media option, and/or user device that may indicate to the media guidance application that a user is performing (or not performing) a particular behavior. For example, a mobile device (e.g., a smartphone) may transmit signals (e.g., indicative that a user is transmitting a text message) that may be detected (e.g., via detection module 316 (FIG. 3)) to determine whether or not a user behavior (e.g., texting) corresponds to a rule or rule set. Alternatively or additionally, the media guidance application (e.g., via detection module 316 (FIG. 3)) may monitor a social network account of a user to determine whether or not content is being uploaded/posted to a social networking account while a user is occupying a vehicle (e.g., in violation of a rule).

At step 610, the media guidance application compares (e.g., via control circuitry 304 (FIG. 3)) the user behavior to the rule to determine whether the user behavior corresponds to the rule, and (e.g., via control circuitry 304 (FIG. 3)) enables or disables the media option in response to determining (e.g., via control circuitry 304 (FIG. 3)) that the user behavior corresponds to (or does not correspond to) the rule at step 612. For example, the user behavior and the rule may be quantified into a particular value, the media guidance application may (e.g., via control circuitry 304 (FIG. 3)) then compare the values to determine whether the two values correspond.

For example, the media guidance application may quantify a rule set that indicates where a predetermined area or route in which the vehicle must remain. Each rule of the rule set may indicate suitable coordinates within the area. The media guidance application (e.g., via control circuitry 304 (FIG. 3)) may determine the current coordinates of the vehicle (e.g., via global positioning data received from global positioning circuitry coupled to control circuitry 304 (FIG. 3)). Based on a comparison of the current coordinates to each of the coordinates associated with the rules of the rule set, the media guidance application may detect (e.g., via control circuitry 304 (FIG. 3)) whether a vehicle (e.g., being manually driven or driven automatically via self-driving capabilities) is outside a predetermined area (or deviating from a predetermined route (e.g., in violation of a rule included in a current rule set), and, in response the media guidance application may disable a media option associated with the vehicle.

In some embodiments, a media option may be associated with a mobile user device (e.g., user equipment device 406 (FIG. 4)), not necessarily associated with the vehicle. For example, the media guidance application may detect (e.g., via detection module 316 (FIG. 3)) a mobile user device is sending/receiving data within the vehicle (e.g., in violation of a rule included in a current rule set), and, in response, the media guidance application (e.g., via control circuitry 304 (FIG. 3)) may disable the use of the mobile user device.

In some embodiments, the media guidance application may perform actions alternatively to, or in addition to, enabling or disabling a media option. For example, in response to determining (e.g., via control circuitry 304 (FIG. 3)) a user behavior is in violation of a rule, the media guidance application may (e.g., via control circuitry 304 (FIG. 3)) notify a user (or a third party) of a relationship between the user behavior and the rule (e.g., the rule that the user is currently in violation of or, a degree to which a user is violating the rule, etc.). For example, if the media guidance application determines (e.g., via control circuitry 304 (FIG. 3)) that a mobile user device located within a vehicle is attempting to access a media option (e.g., send a text message) while the media option is disabled (e.g., text messaging is in violation of a rule), the media guidance application may notify (e.g., via control circuitry 304 (FIG. 3)) a third party (e.g., a parent). For example, the media guidance application (e.g., via control circuitry 304 (FIG. 3)) may transmit a message to another device (e.g., operated by a parent) indicating that the user occupying the vehicle (e.g., a child) is violating a rule.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

Figure 7:
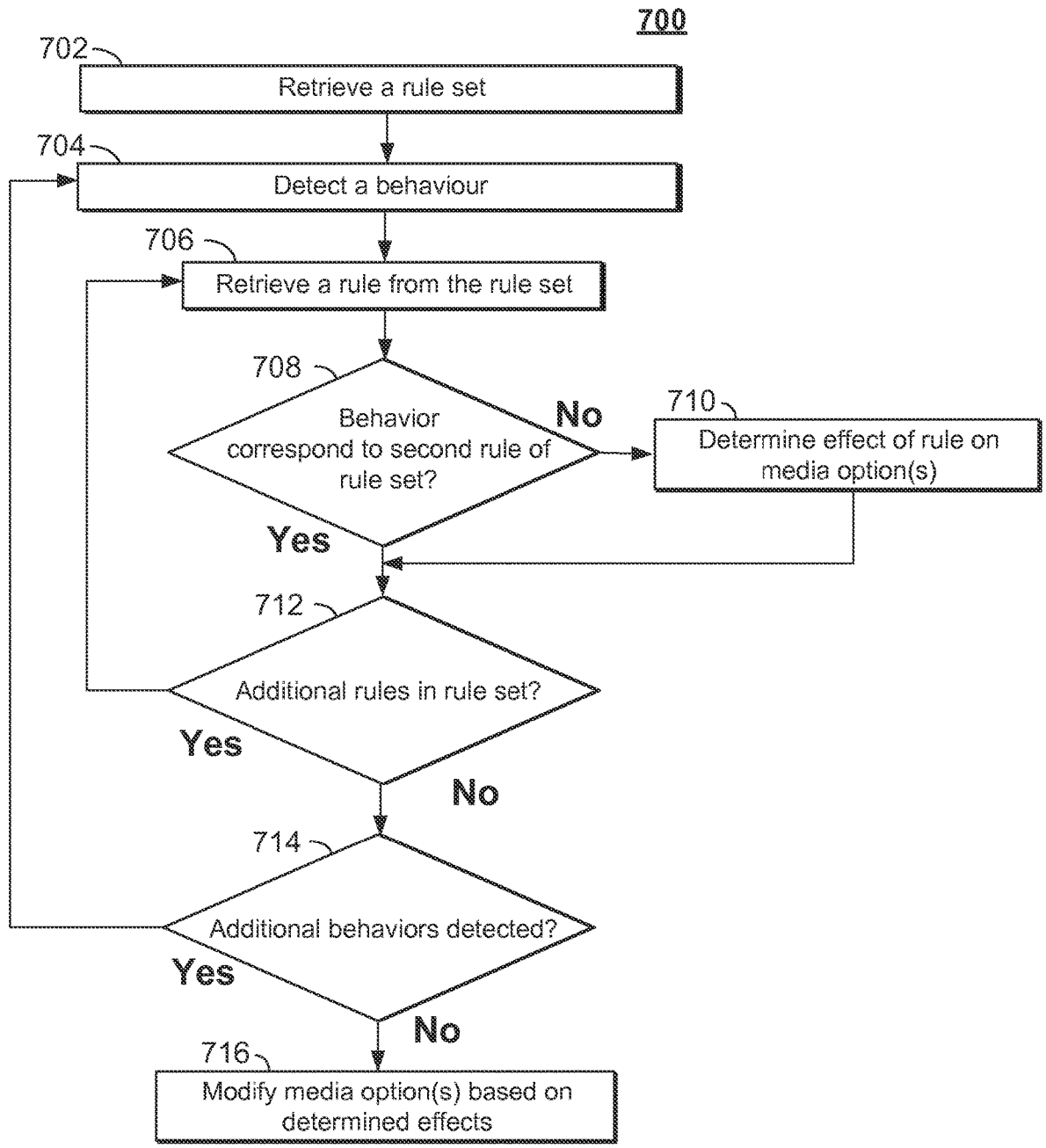
FIG. 7 is a flowchart of illustrative steps for modifying media option(s) based on determined effects of user behavior corresponding to one or more rules in a rule set in accordance with some embodiments of the disclosure.

FIG. 7 is a flowchart of illustrative steps for modifying media option(s) based on determined effects of user behavior corresponding to one or more rules in a rule set. It should be noted that process 700 or any step thereof could be performed on, or provided by, any of the devices shown in FIGS. 3-4. For example, process 700 may be executed by control circuitry 304 (FIG. 3) as instructed by a media guidance application implemented on a user device (e.g., user equipment devices 402, 404, and/or 406 (FIG. 4)) in order to determine whether to determine whether or not a user behavior corresponds to a rule. In addition, one or more steps of process 700 may be incorporated into or combined with one or more steps of any other process or embodiment (e.g., process 600 (FIG. 6)).

At step 702, the media guidance application retrieves (e.g., via control circuitry 304 (FIG. 3)) a rule set. For example, the media guidance application may retrieve a rule set in response to determining a particular user is occupying a vehicle. For example, in response to a user entering a vehicle, the media guidance application may request the user provide identification (e.g., a password, key, biometric measurement, etc.). Upon identifying the user, the media guidance application may (e.g., via control circuitry 304 (FIG. 3)) retrieve (e.g., from storage 308 (FIG. 3) and/or any location accessible via communications network 414 (FIG. 4)) a user profile associated with a user that includes one or more rule sets associated with the user.

At step 704, the media guidance application detects a user behavior. For example, as discussed above in step 608 (FIG. 6), the media guidance application may monitor (e.g., via detection module 316 (FIG. 3)) the user behavior while the user is occupying the vehicle by monitoring global-positioning data received from global positioning circuitry (e.g., incorporated into, coupled to, and/or accessible by control circuitry 304 (FIG. 3)), vehicular speed data received from a speedometer (e.g., incorporated into, coupled to, and/or accessible by control circuitry 304 (FIG. 3)), or vehicular status data received from vehicular circuitry (e.g., incorporated into, coupled to, and/or accessible by control circuitry 304 (FIG. 3)).

At step 706, the media guidance application retrieves a rule from the rule set. For example, the rule set may include one or more rules, or may itself include one or more rule sets. The media guidance application (e.g., via control circuitry 304 (FIG. 3)) retrieves a rule for the rule set to compare it to current user behavior at step 708. If the current user behavior corresponds to the rule set, the media guidance application proceeds to step 710 and determines an effect that not corresponding to the rule set has on one or more media options. For example, in response to determining (e.g., via detection module 316 (FIG. 3) coupled to control circuitry 304 (FIG. 3)) that a user is speeding (e.g., in violation of a rule of a rule set), the media guidance application may no longer allow a user to access an in-vehicle stereo system. In response to determining (e.g., via detection module 316 (FIG. 3) coupled to control circuitry 304 (FIG. 3)) that a user has not gotten an oil change (e.g., in violation of another rule of a rule set), the media guidance application may no longer allow a user to access the air-conditioning. In response to determining (e.g., via detection module 316 (FIG. 3) coupled to control circuitry 304 (FIG. 3)) that a user has not returned home before curfew (e.g., in violation of yet another rule of a rule set), the media guidance application may limit the use of an in-vehicle navigation system (e.g., only show a user how to return home).

At step 712, the media guidance application determines whether or not there are any additional rules in the rule set. For example, the media guidance application (e.g., via control circuitry 304 (FIG. 3)) may perform one or more iterations of comparing a retrieve rule to user behavior. If the media guidance application determines (e.g., via control circuitry 304 (FIG. 3)) that there are additional rules, the media guidance application returns to step 706. If the media guidance application determines (e.g., via control circuitry 304 (FIG. 3)) that there are no additional rules in the rule set, the media guidance application proceeds to step 714.

At step 714, the media guidance application determines whether or not there are any additional user behaviors. For example, the media guidance application (e.g., via control circuitry 304 (FIG. 3)) may perform one or more iterations of comparisons of retrieved rules to detected user behaviors. If the media guidance application determines (e.g., via control circuitry 304 (FIG. 3)) that there are additional user behaviors, the media guidance application returns to step 704. If the media guidance application determines (e.g., via control circuitry 304 (FIG. 3)) that there are no additional user behaviors, the media guidance application proceeds to step 716, and at step 716, the media guidance application (e.g., via control circuitry 304 (FIG. 3)) modifies one or more available media options based on the determined effects.

In some embodiments, the media guidance application (e.g., via control circuitry 304 (FIG. 3)) may perform actions alternatively to, or in addition to, enabling or disabling a media option. For example, in response to determining (e.g., via control circuitry 304 (FIG. 3)) a user behavior is in violation of a rule, the media guidance application may (e.g., via control circuitry 304 (FIG. 3)) notify a user (or a third party) of a relationship between the user behavior and the rule (e.g., the rule the user is currently in violation or, a degree to which a user is violating the rule, etc.). For example, if the media guidance application determines (e.g., via control circuitry 304 (FIG. 3)) that a mobile user device located within a vehicle is attempting to access a media option (e.g., send a text message) while the media option is disabled (e.g., text messaging is in violation of a rule), the media guidance application may (e.g., via control circuitry 304 (FIG. 3)) notify a third party (e.g., a parent).

In some embodiments, the actions alternatively to, or in addition to, enabling or disabling a media option may include generic punishments. As used herein, a "generic punishment" refers to an action taken by the media guidance application to coerce a particular user behavior. For example, in response to determining (e.g., via control circuitry 304 (FIG. 3)) a user behavior is in violation of a rule, the media guidance application may (e.g., via control circuitry 304 (FIG. 3)) publicly distribute (e.g., via a posting on a social network) embarrassing pictures related to a user. For example, the media guidance application may receive data (e.g., metadata) indicating that a media asset is embarrassing and/or has one or more characteristics of an embarrassing media asset (e.g., the media asset may include an image of the user in which the user is out-of-focus, has his or her eyes closed, etc.). Alternatively, the media guidance application may (e.g., via detection module 316 (FIG. 3)) determine (e.g., via one or more object recognition technique discussed above) that the contents of the media asset are embarrassing to the user.

Alternatively or additionally, the media guidance application may request (e.g., via control circuitry 304 (FIG. 3)) a media asset from a local database (e.g., storage 308 (FIG. 3)) or a remote database (e.g., any device accessible via communications network 414 (FIG. 4)) that is associated with embarrassing media assets of a user. For example, in response to determining that a user is not wearing a seatbelt (e.g., in violation of a rule), the media guidance application may retrieve an embarrassing message related to the rule (e.g., "Joe is too dumb to wear his seatbelt") and publically distribute the message. For example, a third party (e.g., a parent) may upload embarrassing media assets of a user (e.g., a child) to the database. The third party may indicate that each media asset is embarrassing and/or indicate what media asset should be publically distributed in response to particular violations.

In another example, in response to determining (e.g., via control circuitry 304 (FIG. 3)) a user behavior is in violation of a rule, the media guidance application may (e.g., via control circuitry 304 (FIG. 3)) delete media assets (e.g., stored in storage 308 (FIG. 3)) associated with the user or fail to take actions (e.g., record a media asset scheduled to be recorded) requested by the user. Additionally or alternatively, the media guidance application may determine (e.g., via control circuitry 304 (FIG. 3)) that a media asset corresponds to a favorite program of the user. For example, the media guidance application may (e.g., via control circuitry 304 (FIG. 3)) compare attributes associated with stored media assets to user preferences (e.g., retrieved from a user profile stored in storage 308 (FIG. 3)). In response to determining that a particular media asset corresponds to the user preferences, the media guidance application may (e.g., via control circuitry 304 (FIG. 3)) delete the media asset (e.g., from storage 308 (FIG. 3)) or cancel a scheduled recording.

In another example, in response to determining (e.g., via control circuitry 304 (FIG. 3)) a user behavior is in violation of a rule, the media guidance application may (e.g., via control circuitry 304 (FIG. 3)) charge an account associated with the user a fixed fee. For example, the media guidance application may (e.g., via control circuitry 304 (FIG. 3)) retrieve a fixed fee (e.g., as indicated in a database located at storage 308 (FIG. 3) and/or any location accessible via communications network 414 (FIG. 4)) that should be attributed to the account of a user based on the violation. Upon determining that the user behavior is in violation of the rule (e.g., via control circuitry 304 (FIG. 3)), the media guidance application may (e.g., via control circuitry 304 (FIG. 3)) charge an account associated with the user the determined fixed fee.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for encouraging behavior while occupying a vehicle, the method comprising:
    determining, using control circuitry, a goal of a current trip in which a user is engaged;
    associating the current trip with a first set of rules, from a plurality of sets of rules, that are associated with the goal;
    determining, using the control circuitry, an electronic device setting, for an electronic device used for consuming media, that is associated with adherence to the first set of rules;
    monitoring, using the control circuitry, the user's operation of the vehicle while the user is occupying the vehicle as it relates to the user's use of the electronic device by video recording the user and analyzing objects in frames from the recorded video to determine whether the user operation of the vehicle adheres to the first set of rules; and
    enabling the electronic device setting, for the electronic device used for consuming media, in response to determining that the user operation of the vehicle adheres to the first set of rules.

2. The method of claim 1, further comprising:
    determining, using control circuitry, that the goal of the current trip in which the user is engaged relates to a second goal that is distinct from the goal; and
    in response to the determining that the current trip relates to the second goal that is distinct from the goal:
        associating the current trip with a second set of rules, from the plurality of sets of rules, that are associated with the second goal;
        determining, using control circuitry, a media option that is associated with adherence to the second set of rules;
        monitoring, using the control circuitry, the user's behavior while the user is occupying the vehicle as it relates to use of their electronic device to determine whether the user behavior adheres to the second set of rules; and enabling the media option in response to determining that the user behavior adheres to the second set of rules.

3. The method of claim 2, wherein the second goal is unrelated to the user's employment.

4. The method of claim 1, further comprising, applying a different set of rules to the current trip based on different goals of the current trip, wherein each goal of the current trip is associated with a different set of rules.

5. The method of claim 1, wherein determining the goal of the current trip in which a user is engaged is based on a travel itinerary of the current trip.

6. The method of claim 1, wherein determining the goal of the current trip in which a user is engaged is based on a destination of the current trip.

7. The method of claim 6, wherein the destination is related to the user's employment.

8. The method of claim 1, wherein determining the goal of the current trip in which a user is engaged is based on a length of time associated with the current trip.

9. The method of claim 1, further comprising:
based on the monitoring the user's behavior while the user is occupying the vehicle as it relates to use of their electronic device, determining that the user behavior violates the first set of rules; and
in response to the determination that the user behavior violates the first set of rules, disabling the media option that was previously enabled.

10. The method of claim 9, further comprising:
determining that the user is attempting to access the media option while the media option is disabled; and
in response to determining that the user is attempting to access the media option while the media option is disabled, transmitting an alert to a remote user device, wherein the alert provides information related to the attempted access.

11. A system for encouraging behavior while occupying a vehicle, the system comprising:
control circuitry configured to:
determine a goal of a current trip in which a user is engaged;
associate the current trip with a first set of rules, from a plurality of sets of rules, that are associated with the goal;
determine an electronic device setting, for an electronic device used for consuming media, that is associated with adherence to the first set of rules;
monitor the user's operation of the vehicle while the user is occupying the vehicle as it relates to the user's use of the electronic device by video recording the user;
analyze objects in frames from the recorded video to determine whether the user operation of the vehicle adheres to the first set of rules; and
enable the electronic device setting, for the electronic device used for consuming media, in response to determining that the user operation of the vehicle adheres to the first set of rules.

12. The system of claim 11, further comprising, the control circuitry configured to:
determine that the goal of the current trip in which the user is engaged relates to a second goal that is distinct from the goal; and
in response to the determining that the current trip relates to the second goal that is distinct from the goal:
associate the current trip with a second set of rules, from the plurality of sets of rules, that are associated with the second goal;
determine a media option that is associated with adherence to the second set of rules;
monitor the user's behavior while the user is occupying the vehicle as it relates to use of their electronic device to determine whether the user behavior adheres to the second set of rules; and
enable the media option in response to determining that the user behavior adheres to the second set of rules.

13. The system of claim 12, wherein the second goal is unrelated to the user's employment.

14. The system of claim 11, further comprising, the control circuitry configured to apply a different set of rules to the current trip based on different goals of the current trip, wherein each goal of the current trip is associated with a different set of rules.

15. The system of claim 11, wherein determining the goal of the current trip in which a user is engaged is based on a travel itinerary of the current trip.

16. The system of claim 11, wherein determining the goal of the current trip in which a user is engaged is based on a destination of the current trip.

17. The system of claim 16, wherein the destination is related to the user's employment.

18. The system of claim 11, wherein determining the goal of the current trip in which a user is engaged is based on a length of time associated with the current trip.

19. The system of claim 11, further comprising, the control circuitry configured to:
based on the monitoring the user's behavior while the user is occupying the vehicle as it relates to use of their electronic device, determine that the user behavior violates the first set of rules; and
in response to the determination that the user behavior violates the first set of rules, disable the media option that was previously enabled.

20. The system of claim 19, further comprising, the control circuitry configured to:
determine that the user is attempting to access the media option while the media option is disabled; and
in response to determining that the user is attempting to access the media option while the media option is disabled, transmit an alert to a remote user device, wherein the alert provides information related to the attempted access.

* * * * *